United States Patent

Dorfman et al.

[11] Patent Number: 5,960,164
[45] Date of Patent: Sep. 28, 1999

[54] DATA INTERFACE FOR HIGH PERFORMANCE

[75] Inventors: Alexander Dorfman, Tonawanda, N.Y.; Kenneth C. Feldt, Richmond, Va.

[73] Assignee: Moore Business Forms, Inc., Grand Island, N.Y.

[21] Appl. No.: 08/689,150

[22] Filed: Jul. 30, 1996

[51] Int. Cl.⁶ .................................................. B41B 15/00
[52] U.S. Cl. ...................... 395/110; 395/110; 395/114; 395/115; 345/443; 364/920.7
[58] Field of Search ..................................... 395/114, 115, 395/110; 345/443; 364/920.7

[56] References Cited

U.S. PATENT DOCUMENTS

| | | | |
|---|---|---|---|
| 4,839,829 | 6/1989 | Freedman | 395/114 |
| 4,939,670 | 7/1990 | Freiman et al. | 395/110 |

*Primary Examiner*—Edward L. Coles
*Assistant Examiner*—Twyler Lamb
*Attorney, Agent, or Firm*—Nixon & Vanderhye, P.C.

[57] ABSTRACT

A method and system for producing documents at a first site from database information produced at a second site remote from the first site has enhanced system flexibility and enhanced data handling throughput, which are accomplished by adopting standard programming interface or database tables to allow a computer at the second site to obtain information necessary to generate all necessary data codes and stream formatting information which will be utilized at the first site. An object association table, which associates document production jobs with specific documents and appropriate descriptions, is provided at the first site so that it is accessible—e.g. through an online communications network—at the second site. The object association table is accessed at the second site in realizing substantially only file names in the object association table, to produce database information at the second site. The database information is supplied from the second site to the first site where it is translated so that it may be utilized by a specific print engine at the first site, utilizing a job formatting table to build an engine specific print stream for one or more print engines. Then the engine specific print stream, tailored to the particular print engine utilized, electronically controls a specific print engine at the first site to image documents having variable information from the database information supplied from the second site.

20 Claims, 3 Drawing Sheets

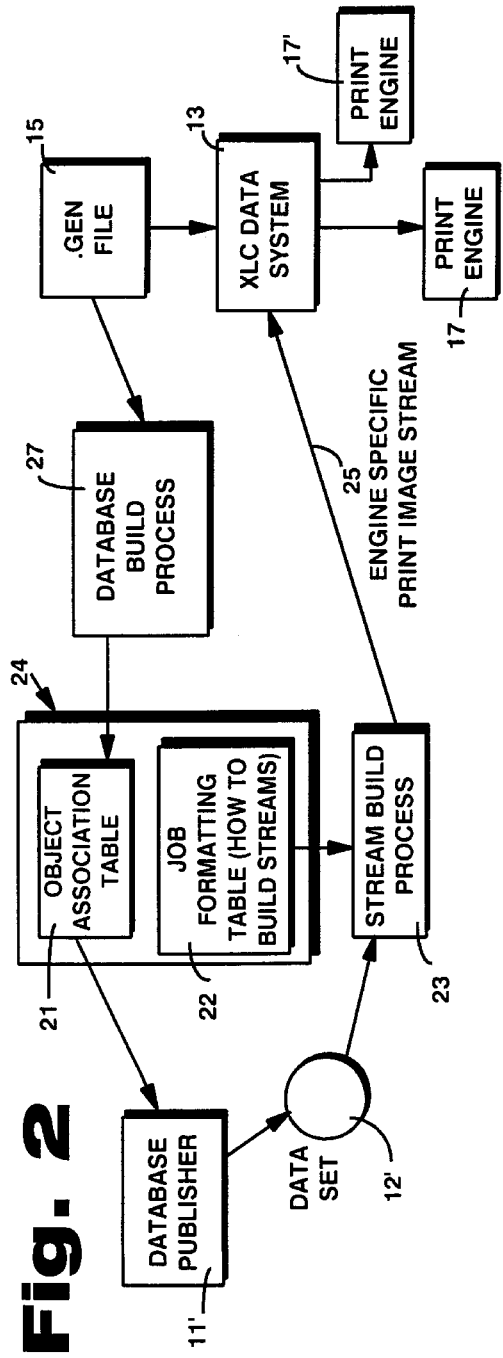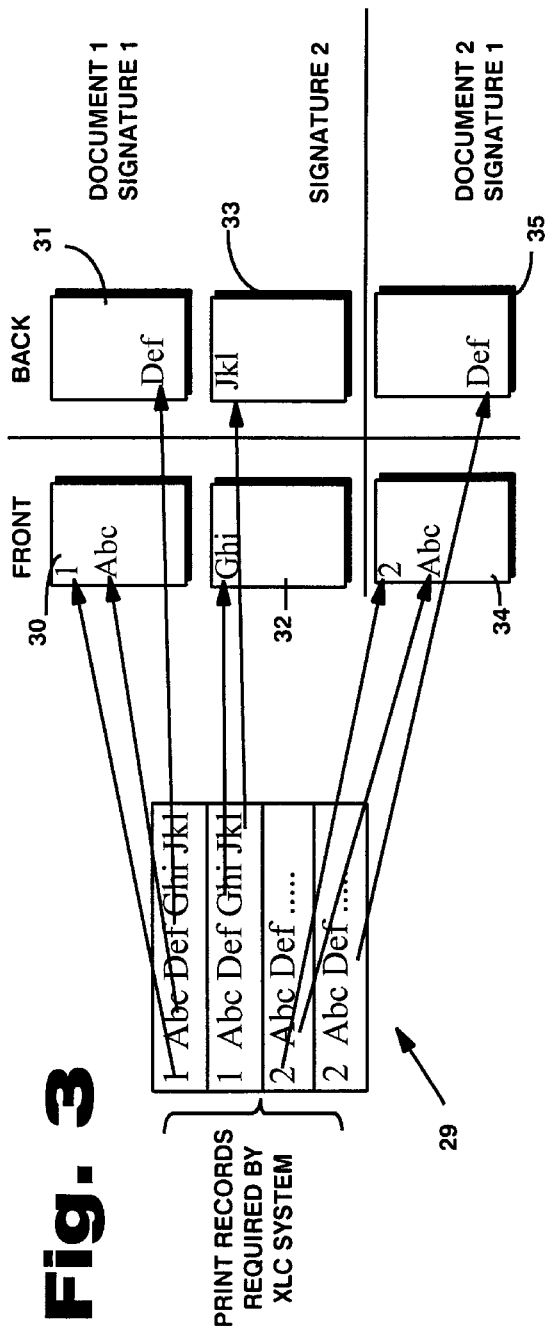

DATA INTERFACE FOR HIGH PERFORMANCE

BACKGROUND AND SUMMARY OF THE INVENTION

There are many entities which produce information in databases that is then used to produce booklets which are mailed or otherwise distributed to end users. Generically these entities may be referred to as database publishing companies, which companies do not have the incentive to invest in the imaging computer systems and print engines that are necessary to produce booklets, or other documentation, therefore the data must be transmitted to another site for actual imaging. In efficient modern installations, the data from the database publishers is taken by the imaging organization, the data is significantly reformulated, and then imaging is practiced. While some time—depending upon the raw data received—final print streams may be produced within several hours after receipt of the raw data, more often the time frame is on the order of days. However in many situations it is highly desirable to be able to turn an entire print job around within twenty-four hours, which is not universally feasible with present technology.

In the present specification and claims, various jargon will be utilized which is specifically identified here for ease of reference:

| TERMINOLOGY | DETAILED DESCRIPTION |
|---|---|
| Background | An image or graphic over which other graphics and text may be imaged. |
| Booklet | A collection of documents to be produced in response to an end user inquiry or need. |
| Document | A collection of hard copy pages logically related to each other through their content, typically formed by a number of signatures, and formulated into a booklet. |
| EPS | Encapsulated postscript files, which are typically converted especially by proprietary imaging systems for use therein. |
| Fixed Data | Graphics and text which are shared among substantially all documents in a print stream. |
| .GEN File | All the information relating to a specific production run are captured in a generic job file. This file is initially developed when a job is configured. |
| Job Formatting Table | A table which provides a translation mechanism to map variable data fields provided by a database publisher to the actual data stream read by the print system. The data stream is of a format which is specific to a given printer, reflecting engine specific parameters such as resolution and imposition, and serving to "hide" production specific information from the database publisher. |
| Object Association Table | A table which identifies print ready documents which are appropriate for getting jobs. Included are descriptions of the documents and certain production information such as the number of signatures, target markets, etc. When utilized by a database publisher, substantially only the file names included in the table may be utilized. |
| Print Image Stream | The final variable stream provided to |

| TERMINOLOGY | DETAILED DESCRIPTION |
|---|---|
| | the XLC ["Digital ColorQuick"] imaging system. The print image stream is specific to the individual type of printer and the production method (imposition). |
| RIP | A raster image processor, comprising electronics which assemble individual bitmaps and images into a document which is printed. |
| Selectable Criteria | Combination of text, graphics and images which can be printed on a document with an imaging systems' receipt of a single data code. Selectable criteria codes are defined in a ".GEN file" and passed to an imaging system with a variable data stream. |
| Signature | A sheet of paper which is folded into a collection of pages to be included in a document. Signatures may include imaging on both sides. |
| Variable Data | Unique text information compared to other documents in the same print stream, which almost always originates from the database publisher and may include name, address, telephone, and like information. |
| VBI | Variable bit image codes, a single image being associated with a data code utilizing variable bit image codes. Unlike selectable criteria VBIs refer to only one set of spatial data (such as position, size, etc.). VBIs are passed to the system in the variable data stream. |
| VCC Station | A variable color configuration station. Takes care of pre-screening all imaged data in its final "print ready" form; that is images are sized and rotated for the final appearance as required by the print job, and the images are then stored on a file server where they reside until required by an imaging run. |
| XLC Data System | Electronics and software available from Moore Business Forms, Inc. of Lake Forest, Illinois which preprocess job information prior to imaging of individual documents. The processing includes the preloading of images, the reading of variable data, web synchronization, and other functions. Its official commercial name is "Digital ColorQuick". |
| .XLF File | An XLC proprietary file comprising a prescreened (rasterized) graphic element which is ready to be printed on a resolution specific device. |

According to the present invention, a method and system are provided which significantly enhance the present ability to turn around entire print jobs. According to the present invention data is provided to a database publisher in the form of the object association table so that elements necessary to facilitate the production of a final print stream are greatly expanded. The database tables, which comprise a standard programming interface, enhance system flexibility and enhance data handling throughput, allowing an entire print job to be turned around within twenty-four hours of data closeout by the database publisher, something heretofore possible only on an irregular basis for specific small jobs.

According to one aspect of the present invention a method of producing documents at a first site from database information produced at a second site remote from the first site is provided, utilizing a specific print engine (which may be of any conventional type, such as a MIDAX printer available from Moore Business Forms, Inc., or a Xeikon printer). The method comprises the following steps: (a) Providing the object association table, which associates document production jobs with specific documents and appropriate object descriptions, so that it is accessible at the second site. (b) Accessing the object association table at the second site, and utilizing substantially only file names in the object association table, producing database information at the second site. (c) Supplying the database information from the second site to a translation site, and translating the database information from the second site so that it may be utilized by the specific print engine at the first site, utilizing a job formatting table to build an engine specific print image stream. And, (d) utilizing the engine specific print image stream to electronically control the specific print engine at the first site to image documents having variable information from the database information supplied in step (c).

Step (A) may be practiced in alternative manners. For example it may be practiced on-line through a communications network, or by supplying the object association table in machine readable form to the second site (e.g. via disc, tape, or the like) for incorporation into a computer system at the second site. Typically the object association table is provided at the first site and accessible from the second site, and step (c) is typically practiced so that the database information is supplied to and translated at the first site. The engine specific print stream typically has all variable information for control of the print engine, BI coded and selectable criteria codes.

Step (b) may be practiced by document sorting according to a predetermined delivery mechanism, providing document references for all documents to be produced at the first site using the object association table, and adding variable data to the documents. Steps (c) and (d) may be practiced to image on the fly directly from the data source the character data for the print engine, typically only the font data being pre-rasterized, or an XLC system may pre-rasterize only the font and character data; with all variable data being provided from steps (b) and (c) in the engine specific print image stream, so that the print engine can print with substantially no limitations related to the number of different text combinations.

A plurality of different specific print engines may be provided at the first site. Step (c) is then practiced to build a different engine specific print stream depending upon which print engine is utilized.

The invention also relates to a system for producing documents at a first site from database information produced at a second site remote from the first site. The system may comprise the following components: A first computer remote from the second site containing an object association table which associates document production jobs with specific documents and appropriate object descriptions. A specific print engine at the first site for imaging documents, and electronically controlled by a specific variable print image stream. A second computer at the second site capable of using the object association table to produce database information containing specific file names. A third computer remote from the second site for using the database information supplied by the second computer and a job formatting table contained within the third computer for translating the database information containing specific file names from the second computer to produce a print image stream specifically for controlling the specific print engine. And, a fourth computer at the first site connected to the specific print engine utilizing the print image stream from the third computer, along with other data, to control the specific print engine to print desired documents containing variable information provided from the second computer database information.

The first and third computers may be provided within the same computer housing, at the first site, and the fourth computer is typically the electronics part of the XLC data system {Digital ColorQuick} and is distinct from the first and third computers. Telephone lines are typically provided for providing the communication between the first computer and the second computer so that the second computer may access the object association table on-line. A plurality of specific print engines may be provided at the first site each controlled by different specific print image streams, and the third computer, and job formatting table contained therein, may produce different specific print image streams depending upon which specific print engine of the plurality of print engines is to be controlled by the fourth computer to produce desired printed documents.

Preferably the fourth computer images on the fly directly from the data source substantially the character data for the print engine, substantially only the font data being pre-rasterized, or substantially only the font and character data is pre-rasterized, with all variable data being provided by the print image stream, so that the print engine can print with substantially no limitations related to the number of different text combinations.

According to another aspect of the present invention a method of setting up a system for a data publisher to provide data for a remote imaging system to print and merge the data in signatures which are combined into a document, and where a number of documents are combined to produce a booklet, is provided. The method comprises the following steps: (a) Setting the document standards for construction including the number of documents per booklet. (b) Identifying the variable data fields associated with each document while specifying that the document which will be produced for a given production run have the same number and type of variable fields. (c) Defining the fonts and characters for variable data at the time individual jobs are built. (d) Defining variable data so that is limited to text elements which are very likely to change from document to document or from production run to production run. (e) Identifying the output sorting requirements for the documents. (f) Determining document identifiers and their variable fields in a manner that effects a production cycle. (g) Determining how frequently document changes will be processed. And, (h) converting document data supplied as a result of steps (a) through (g) into imposed, rasterized bitmaps which are built and rotated to reflect the production for a specific combination of production methods. Step (h) may be practiced by the sub-steps of: (h1) Converting data to be supplied to the system into resolution specific bitmaps. (h2) Imposing the data from the resolution specific bitmaps onto a specific signature. And, (h3) positioning and rotating variable text fields as each signature is built.

It is the primary object of the present invention to provide for the enhanced flexibility and data handling to produce booklets or documentation for mailings, distributions, or the like. This and other objects of the invention will become clear from the detailed description of the invention and from the appended claims.

BRIEF DESCRIPTION OF THE DRAWINGS

FIG. 2 is a view like that of FIG. 1 showing the system according to the present invention;

FIG. 3 is a schematic illustration demonstrating how data is ultimately formatted for imaging on an XLC driven print system assuming one document produced from two signatures with front and back printing, with only variable data shown for simplicity of illustration.

DETAILED DESCRIPTION OF THE DRAWINGS

Figure 1:
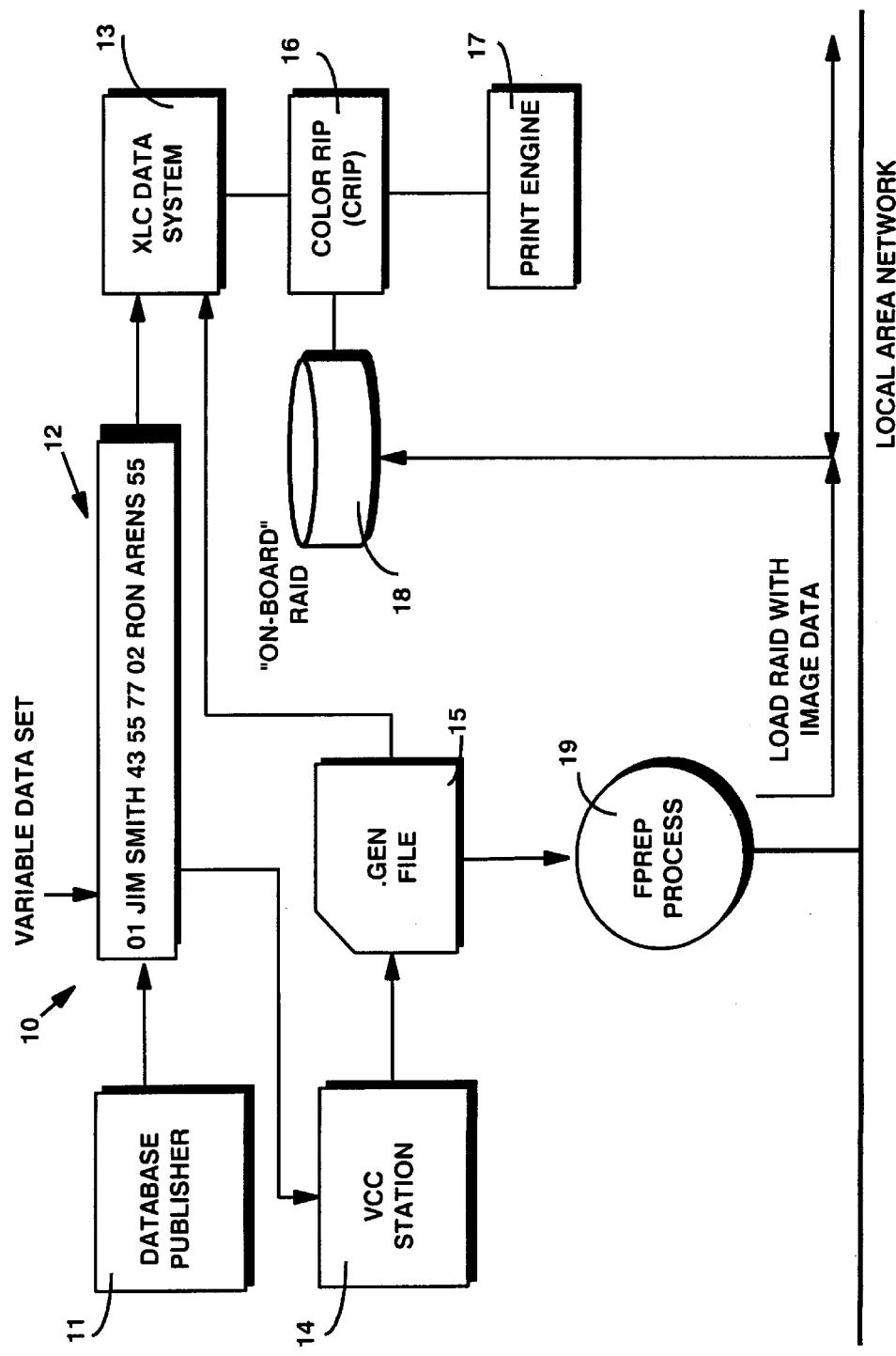
FIG. 1 is a schematic representation of the prior art configuration of the production of booklets from data supplied by the database publisher.

FIG. 1 schematically illustrates at 10 an example of an efficient modern system according to the prior art for the production of booklets or like documentation from data, including substantially all the variable data, supplied by database publishing companies or like entities. The database publisher 11 at a remote site builds a variable data set, as illustrated generally at 12 in FIG. 1. The variable data set 12 identifies all of the documents to be imaged in a production run, therefore any pre-sorting in order to accommodate postal delivery procedures must be done at this time. The stream is forwarded to the XL data system 13.

Also the data stream 12 is analyzed and its record layout recaptured as "variable tags" at the VCC station 14. Possible data contained in the fields is then recategorized as variable text, VBI codes, or selectable criteria, and such information entered at the VCC station 14. That is the VCC station 14 defines all selectable criteria and the comparison conditions, defines all VBI codes, and defines the stream record layout for variable data, VBI codes, selectable criteria, and print qualities as well as prescreening all imaged data in its final print ready form as described in the definition of the VCC station 14 above. The output from the VCC station 14 is the .GEN file 15, which is also provided to the XLC data system 13 [Digital ColorQuick].

The XLC data system 13, through a color RIP 16, controls one or more print engines 17 at a first site remote from the database publisher 11, to produce the booklets, documentation or the like. The color RIP 16 is also connected to an "on-board" RAID 18. A utility program, F-PREP—illustrated schematically at 19 in FIG. 1—is also supplied with data from .GEN file 15, and is executed. The program 19 reads the .GEN file 15 and builds a list of images required for a production run. This list identifies all possible images as defined in the .GEN file 15. If those images are not already present on the RAID drive 18 they are read from the local area network onto the RAID drive 18.

The XLC data system 13 reads the .GEN file 15 and uses it as a specification to help decode data on the variable data streams 12. Text is imaged "dynamically"; that is there are no pre-rasterized text blocks which exist as variable data. All codes (VBI, selectable criteria, etc.) are read and mapped to the images which exist on the on-board RAID drive 18.

While the system 10 illustrated in FIG. 1 is a highly efficient and successful system, typically it may take days from the data closeout by the database publisher 11 until an entire print job is completed since it takes time frames of from several hours to days in order to produce the final print streams in receipt of the raw data from the database publisher 11. However it is desirable to regularly be able to turn an entire print job around within twenty-four hours of data closeout, and it is for this purpose that the invention has been developed. Utilizing the exemplary system according to the present invention schematically illustrated in FIG. 2 enhancements in system flexibility and in the flexibility of data handling throughput are accomplished through the adoption of a standard programming interface, or data tables. This allows the database publisher 11' to obtain the information necessary to generate all necessary data codes and stream formatting information. The data set 12' produced by the database publisher 11' as schematically illustrated in FIG. 2 enables the database publisher to produce data which can easily be converted at the first site, by the printing organization, into a print image stream.

The system of FIG. 2 achieves the desired advantages discussed above by utilizing an object association table 21 and a job formatting table 22. The object association table 21, as defined above, is accessible by the database publisher 11' either through telephone or like telecommunication lines, or by receipt of computer discs or tapes from the first site which are transported to the database publisher 11' at the second site, or in any other suitable manner. The database publisher's 11' software must use substantially only the file names included in the object association table 21.

The object association table 21 may be implemented as an SQL compliant database, or as other tables captured in PC compatible workstations (such as Microsoft Access®). In either event the appropriate database utilities may be used to export the tables for import into any other desired database engine. The purpose of the Object Association Table is to provide the user with the codes assigned to the objects, used to build user documents, by the XLC system 13. There are two types of objects: selectable groups (templates), and Images. Along with the variable text data, that represents the data that the user wants to print. An exemplary simplified configuration of the object association table may be as illustrated in the following Table I, the object association table relating codes for Variable Bit Images and Selectable Criteria to objects reflecting rules of business (e.g. "summer vacation package" =VBI code 32; "Paris destination" =Selectable Criteria PARIS):

TABLE I

| Field Name: | Type: | Size (Bytes): | Description |
| --- | --- | --- | --- |
| Customer ID | Char | 64 | Unique customer ID |
| Object ID | Int | 4 | Unique object ID |
| Parent ID | Char | 64 | ID of original image file |
| Filename | Char | 64 | Filename for the image object |
| Description | Char | 128 | Text description of image file |

Another simplified form the Object Association Table may take is:

TABLE IA

| Field Name | Description |
| --- | --- |
| Customer ID | Unique Customer ID |
| Job ID | Unique Job ID for the Customer |
| Object Code | The code assigned to the object by the XLC System |
| Object Type | Image/Selectable Group |
| Description | The Description of the object |

The object association table 21 and the job formatting table 22 are associated with computers which are of course distinct from the computer of the database publisher 11'. However the tables 21, 22 may be provided within the same computer housing as schematically illustrated at 24 in FIG. 2 (e.g. are parts of the same computer). A job formatting table 22 is used as schematically illustrated at 23 to build an engine specific print image stream 25. Supplied to the stream build process is the data set 12' which has been produced by the database publisher 11' utilizing the object association table 21. A greatly simplified form that the data set 12' that is utilized in the stream build process 23 may take, assuming a booklet of two documents with name information to be printed somewhere on the booklet along with other information (for example hotel rate information for three hotels on each of the two documents) might be as illustrated in Table II below:

TABLE II

| Name | Doc1_id | D1H1_rate | D1H2_rate | D1H3_rate | Doc2_id | D2H1_rate | D2H2_rate | D2H3_rate |
| --- | --- | --- | --- | --- | --- | --- | --- | --- |
| Jon Smith | Ho_London | 550 | 560 | 590 | CL_London | 480 | 550 | 570 |
| Jim Hay | B1_London | 540 | 550 | 570 | K1_London | 500 | 570 | 590 |
| Ron Ary | C1_London | 530 | 550 | 570 | B1_London | 530 | 600 | 620 |

The job formatting table 22 provides a translation mechanism at a translation site (preferably the first site where the print engines 17, 17' are located) to map variable data fields provided in data set 12' which is specific to the particular print engine 17, 17' and reflects engine specific parameters such as resolution and imposition, while serving to "hide" production specific information from the data publisher 11'. The purpose of the job formatting table 22 is to identify the placement of the data the user selected for printing. This is done by providing the user with the list of fields generated by the XLC system 13 during the job layout process. The job formatting table 22 will typically be used only internally at the first site, and will not be accessible to the database publisher 11' both for security and efficiency reasons. This table too may be implemented as an "SQL" complied database, or as another table captured in PC compatible workstations. An extremely simplified form that the table 22 may take is illustrated in Table III below:

TABLE III

| Field Name: | Type: | Size (Bytes): | Description |
| --- | --- | --- | --- |
| Job ID | Char | 64 | References Generic Job File |
| Customer ID | Char | 64 | Unique customer ID |

An alternative, also simplified, form is:

TABLE IIIA

| Field Name | Description |
| --- | --- |
| Customer ID | Unique Customer ID |
| Job ID | Unique Job ID for the Customer |
| Field Name | The field name assigned by the XLC system |
| Description | The Description of the purpose of the field |

The engine specific print image stream 25 is supplied to the XLC data system 13 along with data from the .GEN file 15, and the one or more print engines 17, 17' (such as MIDAX® or Xeikon print engines) are controlled to image the appropriate signatures, and ultimately utilizing conventional assembly techniques appropriate documents and booklets are created. The XLC data system 13 comprises a computer, with electronics and software, which is capable of controlling all phases of the booklet production. For simplicity in FIG. 2 the color RIP 16 and VCC station 14 are not illustrated, but may also be included. FIG. 2 also illustrates at 27 the database build process which is utilized periodically to update the object association table 21 and/or job formatting table 22.

FIG. 3 schematically illustrates how data is ultimately formatted for imaging on the XLC data system 13 driven print systems. FIG. 3 illustrates at 29 the print records required by the XLC system 13 assuming a first document produced from two signatures including document front 30 and back 31 of a first signature, and front 32 and back 33 of a second signature, with only variable data shown in FIG. 3 for simplicity of the illustration. A second document is produced from one signature, having a front 34 and a back 35. Documents one and two as illustrated in FIG. 3 are then assembled by conventional means into a booklet which is the final product and may be mailed or otherwise distributed at a first site.

Utilizing the system as illustrated in FIG. 2, it will be seen that the data formatting of the specific print image stream 25 can be affected by different forms of imposition of a document. The system of FIGS. 2 and 3 is intended to isolate the database publisher 11' from the level of detail for the print image stream 25 while producing data for imaging. The object association table 21 is thus used by the database publisher 11' to identify necessary documents, while the job formatting table 22 is used to internally build the variable image stream 25 for a specific imposed set of signatures.

Utilizing the system of FIGS. 2 and 3 the database publisher 11' will include in the data set 12' document references for all of the documents to be inserted in the booklet stream. The document specifications will be converted by the imaging system to specific background pages onto which variable data can be overlaid. The documents will need to be sorted according to whatever delivery mechanism is appropriate; this means that sorting should accommodate bulk mailing regulations, courier delivery routes, or the like. The variable data to be included on all the documents, is schematically illustrated in Table II, above.

At the first site, where the computer 24 is located, the data set 12' will be received from the database publisher 11'. The data set 12' may be a flat file but more likely will be a database table which is supplied from the printing organization at the first site and filled in by the database publisher's computer. The data set 12' is processed by software, and applied against the job formatting table 22 (as schematically illustrated in Table III), resulting in the print image stream 25 which is customized for a specific production line. Many imaging systems which support variable text do so by pre-rasterizing all the variable text and downloading some bit or graphic image presentation of the text into the print engine. However the XLC system 13 processes text by pre-rasterizing only the fonts and characters. All variable data is built dynamically by the imaging system in the stream build process 23. Once a given font is downloaded into the system the printer can (theoretically) print with substantially no limitations related to the number of different text combinations. The XLC system 13 will pre-RIP all document pages as part of its internal job set up operation.

The source of these documents can be any design application which can be generated as an EPS file; in fact it is expected that the document identification can actually be the file name of the original design application. Certain pages of a document may periodically change appearance (for example to include special rates, special offers, or the like) but may not require support as a variable data field. These documents are up-dated in the .GEN file 15 and are not part of the variable print image stream 25.

Thus the database publisher 11' specifies document identifiers and variable data while the imaging system at the first site prints all the sheets of that document and merges the variable data. The VCC station 14 provides "middleware" which provides the initial database information which relates document IDs to bit images of signatures, and variable data fields, to fields provided by the database publisher, as indicated at 24.

In the design of a system for implementing what is illustrated in FIGS. 2 and 3, there are a number of different job design responsibilities that should be accomplished. These are illustrated schematically in the high level flow sheet of FIG. 4.

The first phase is to design the application. This phase requires a careful analysis of the document production. For multiple document production—that is where a booklet is actually produced out of a combination of documents—this analysis includes the steps illustrated at 40 through 43 in FIG. 4.

The first step 40 is to set the document standards for construction. While the print system is flexible enough to handle any number of combinations of documents and sizes, simplicity usually yields production efficiencies. If a booklet consists of some introductory information, that introductory information or document should be utilized for every booklet. In step 40 the total number of documents per booklet is standardized. While the number of total documents per booklet can vary, it is desirable—for the sake of simplified finishing operations—that all booklets maintain the same number of documents.

Figure 4:
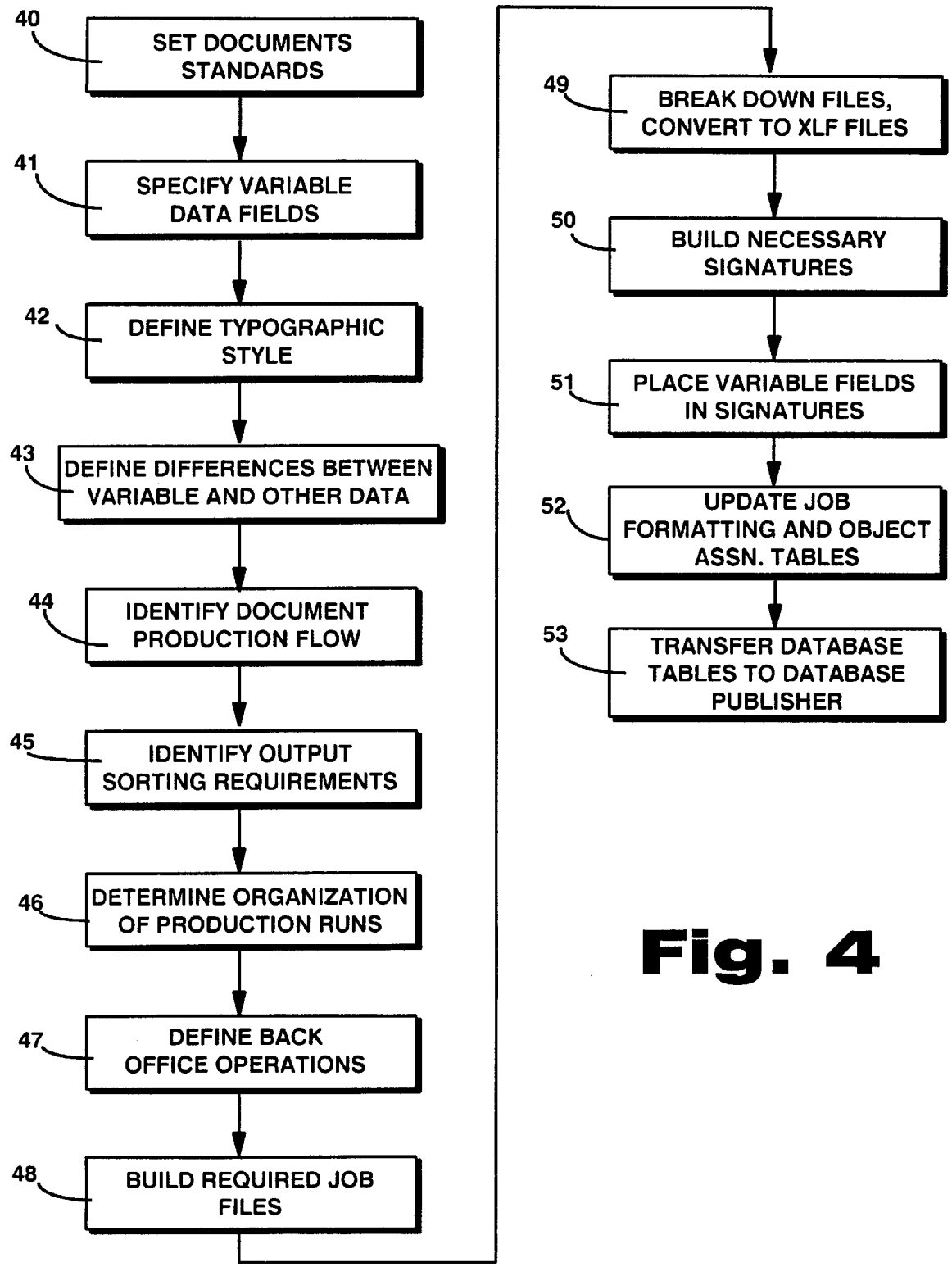
FIG. 4 is a high level flow sheet illustrating how an application can be designed, document production flow identified, and required job files built, according to the present invention.

As schematically illustrated at 41 in FIG. 4, the variable data fields are specified. Each document will have associated with it some variable data fields. These need to be identified as part of the application design process. For example some documents have a variable number of fields—a document for one publisher 11', for example, may have eight rows of variable data while the same document for another database publisher 11' may need ten rows of data. For cases such as this the maximum number of rows needs to be defined, and the designer will assume that all documents hold the maximum number of records. That is the data system will "pad" out unused documents with blanks. In the implementation of step 41 it is substantially necessary that all the documents which may be produced for a given production run have the same number and type of variable fields. For example all documents might have five variable pricing fields for hotels, two fields for name and address, etc.

As illustrated at 42 in FIG. 4 it is necessary to define the typographic style for the variable data. There is no capability of the system to directly read font styles and sizes from a variable data stream 12' or the engine specific print image stream 25. Therefore the fonts and characters (styles) for variable textual data must be defined at the time that the jobs are built so that the appearance of the variable data must be understood prior to job development, and can be implemented in the control provided by the XLC system 13.

As illustrated schematically at 43 in FIG. 4, it is highly desirable to define the distinction between variable data and other data. Variable data should be limited to text elements which are very likely to change from document to document, or from production run to production run. Variable data is best processed when organized as lists of lines, or as individual lines scattered through the document. Variable data may be inserted into a text paragraph, but care must be taken to accommodate the impact of varying lengths of variable data in paragraph text flow.

Graphics and image data which changes periodically (e.g. weekly or less frequently), which is inherent in the document content (e.g. seasonal pictures of London for a London brochure), or data which is very tightly integrated into the visual design of the document should be 'built into' the system in the native design application (e.g. Quark or PageMaker files) and referenced through the selectable criteria mechanism of the XLC system 13.

Other changing elements such as credit card graphics, pictures of products which are a function of variable data, or other logical associations of graphics and text may be configured as variable, selectable, or fixed, and are subject to the design decisions of individual application developers.

The next major task is illustrated schematically at 44 in FIG. 4, and comprises identification of the document production flow. All systems have limitations or enhanced features which may encourage specific types of work flows or data "ganging". For example the XLC imaging system 13 is limited at the present time to 1024 different selectable criteria and 3,000 VBI codes per production run. Since selectable criteria are used primarily to identify documents and VBI codes for specific pictures, these must be considered when designing the documents and planning for the electronic production work flow. Steps 45 through 47 relate to the particular sub-steps for accomplishing the identification of the document production flow.

As illustrated at 45 in FIG. 4, the output sorting requirements must be identified. Most often, the way jobs are organized are a function of output sorting for specific delivery mechanisms. For direct mail applications, this means documents will be sorted by some type of postal code. Other applications may involve sorting by other location codes (such as store codes, telephone codes, etc.). This information is also important to those handling output document finishing.

As illustrated schematically at 46 in FIG. 4, it is desirable to also determine the most likely way to organize production runs. Document identifiers and their variable fields may need to be named in a manner which affects the production cycle. For example, since the XLC system 13 can support no more than 1024 selectable criteria (document identifiers), and if output sorting requirements make it likely that the document type count may be exceeded (for example 50 banks with 25 different brochures which exist in the same postal code yielding 1250 possible document types), then the data stream may need to be broken up into some additional order.

As illustrated at 47 in FIG. 4 it is also desirable to define a document "back office" operations. This means that it is necessary to determine how frequently document changes will be processed, as well as the authorization process (for example who does approve changes to document copy, is version control required, or the like). In this way the complete identification of the document production flow may be effected.

The next phase of the design is schematically illustrated in FIG. 4 is to build the required job files as illustrated at 48 in FIG. 4. Electronic print processes require conversion of standard desktop publishing documents into imposed, rasterized bitmaps. These bitmaps must be built and rotated to reflect the production or a specific combination of production methods. Variable data fields also need to be understood during the job preparation process. All the topics defined above (sorting, organization of production runs, and back office operations) must likewise be understood as the job files are built. The required job files build 48 is implemented, for example, by utilizing the steps schematically illustrated at 49–53 in FIG. 4.

As systematically illustrated at 49 in FIG. 4, the original lo files are converted to .XLF files. The original files typically would be Quark or PageMaker files saved as individual EPS pages, and then converted .XLF files, which are the resolution specific bitmaps of the XLC system 13. The .XLF files are build using a VCC station to do the conversion. The EPS files need to be rotated for a specific signature (imposed) prior to conversion. The converted .XLF files are moved to a server which acts as the main library for the XLC system 13.

As illustrated schematically at 50 in FIG. 4, one must build the necessary signatures. The VCC station (14) allows the designer to position the imposed .XLF files onto a specific signature. As each signature is built it is assigned to a selectable criteria or signature identification, which is derived from the document used by the database publisher 11'. For example, assume a document with an ID of "ABC__London" requires two signatures. The selectable criteria for the first signature would be "ABC__London-1", and the selectable criteria for the second signature would be "ABC__London-2".

Block 51 in FIG. 4 illustrates placing of the required variable fields on the signatures. As each signature is built the operator must position and rotate the variable text fields as they would appear on the final product. The VCC operator will associate the fields with fields from the job formatting table 22, and here all typographic attributes for the variable data to be included in the stream 25 are assigned.

As illustrated at 52 in FIG. 4, it is desirable to update the job formatting table 22 and the object association table 21 by capturing the information in the .GEN file 15, through the database build process 27, and to the database table 21, 22 necessary for the job. The specific tasks will vary depending upon the frequency of updating and a number of other factors.

Finally as illustrated at block 53 in FIG. 4, the general criteria 48 is further accomplished by transferring database tables, particularly the object association table 21, to the database publisher 11'. This is desirably accomplished over telecommunication lines to allow on-line access, and the particular protocol that is most desirable is implemented.

Thus an effective implementation of what is illustrated in FIG. 4 is to build all the documents utilizing standard desktop publishing packages such as Quark or PageMaker. Then the documents are saved as individual EPS pages, rotated as needed for imposition. The VCC station (14) is used to convert the EPS stages into .XLF files. Then the VCC station (14) is used to build as many signatures as needed to produce individual documents and a signature ID is assigned to each signature utilizing the selectable criteria feature of the XLC system 13. Then the VCC station (14) is used to position variable text fields and assign field names and record positions within the print image stream 25. A PC may be utilized to update the XLC system 13 database, entering document information, required fields, etc. The produced database object association table 21 is transferred to the database publisher 11'.

It will thus be seen that according to the present invention an effective method and system are provided for the enhanced production of booklets or like documentation from raw data supplied by a database publisher or the like. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of producing documents at a first site from database information produced at a second site remote from the first site, using an object association table which associates document production jobs with specific documents and appropriate object descriptions, and utilizing a specific print engine at the first site, comprising the steps of:

(a) providing the object association table, which associates document production jobs with specific documents and appropriate object descriptions, so that it is accessible at the second site;

(b) accessing the object association table at the second site, and utilizing substantially only file names in the object association table, producing database information at the second site;

(c) supplying the database information from the second site to a translation site, and translating the database information from the second site so that it may be utilized by the specific print engine at the first site, utilizing a job formatting table to build an engine specific print image stream; and (d) utilizing the engine specific print image stream to electronically control the specific print engine at the first site to image documents having variable information from the database information supplied in step (c).

2. A method as recited in claim 1 wherein step (b) is practiced on line through a communications network.

3. A method as recited in claim 1 wherein step (A) is practiced by supplying the object association table in machine readable form to the second site for incorporation into a computer system at the second site.

4. A method as recited in claim 1 wherein the engine specific print stream has all variable information for control of the print engine.

5. A method as recited in claim 1 wherein step (b) is practiced by document sorting according to a predetermined delivery mechanism, providing document references for all documents to be produced at the first site using the object association table, and adding variable data to the documents.

6. A method as recited in claim 1 wherein a plurality of different specific print engines are provide at the first site; and wherein step (c) is practiced to build a different engine specific print image stream depending upon which print engine is utilized.

7. A method as recited in claim 2 wherein the object association table is provided at the first site and accessible from the second site, and wherein step (c) is practiced so that the database information is supplied to, and translated at, the first site.

8. A method as recited in claim 5 wherein steps (c) and (d) are practiced to pre-rasterize substantially only font and character data for the print engine, all variable data being provided from steps (b) and (c) in the engine specific print image stream, so that the print engine can print with substantially no limitations related to the number of different text combinations.

9. A method as recited in claim 7 wherein a plurality of different specific print engines are provide at the first site; and wherein step (c) is practiced to build a different engine specific print image stream depending upon which print engine is utilized.

10. A system for producing documents at a first site from database information produced at a second site remote from the first site, comprising:

a first computer remote from the second site containing an object association table which associates document production jobs with specific documents and appropriate object descriptions;

a specific print engine at the first site for imaging documents, and electronically controlled by a specific variable print data stream;

a second computer at the second site capable of using the object association table to produce database information containing specific file names;

a third computer remote from the second site for using the database information supplied by said second computer and a job formatting table contained within the third computer for translating the database information containing specific file names from the second computer to produce a print image stream specifically for controlling said specific print engine; and a fourth computer at said first site connected to said specific print engine utilizing the print image stream from said third computer, along with other data, to control said specific print engine to print desired documents containing variable information provided from said second computer database information; and wherein said first and third computers are at said first site.

11. A system as recited in claim 10 wherein said first and third computers are provided within the same computer housing, and said fourth computer is distinct from said first and third computers.

12. A system as recited in claim 10 further comprising telephone lines providing communication between said first computer and said second computer so that said second computer may access said object association table on line.

13. A system as recited in claim 10 further comprising a plurality of specific print engines at said first site each controlled by different specific print image streams; and wherein said third computer and job formatting table contained therein produce different specific print image streams depending upon which specific print engine, of said plurality of print engines, is to be controlled by said fourth computer to produce desired printed documents.

14. A system as recited in claim 10 wherein said first and third computers are different parts of the same computer, and said fourth computer is distinct from said first and third computers.

15. A system as recited in claim 14 further comprising a plurality of specific print engines at said first site each controlled by different specific print image streams; and wherein said third computer and job formatting table contained therein produce different specific print image streams depending upon which specific print engine, of said plurality of print engines, is to be controlled by said fourth computer to produce desired printed documents.

16. A system as recited in claim 15 wherein said fourth computer pre-rasterizes font data for said print engine, all variable data being provided by the print image stream, so that said print engine can print with substantially no limitations related to the number of different text combinations.

17. A method of setting up a system for a data publisher to provide data for a remote imaging system to print and merge the data in signatures which are combined into a document, and where a number of documents are combined to produce a booklet, comprising the steps of:

(a) setting the document standards for construction including the number of documents per booklet;

(b) identifying the variable data fields associated with each document while specifying that the document which will be produced for a given production run have the same number and type of variable fields;

(c) defining the fonts and characters for variable data at the time individual jobs are built;

(d) defining variable data so that it is limited to text elements which are very likely to change from document to document or from production run to production run;

(e) identifying the output sorting requirements for the documents;

(f) determining document identifiers and their variable fields in a manner that effects a production cycle;

(g) determining how frequently document changes will be processed; and (h) converting document data supplied as a result of steps (a) through (g) into imposed, rasterized bitmaps which are built and rotated to reflect production for a specific combination of production methods.

18. A method as recited in claim 17 wherein step (h) is practiced utilizing an electronics and software system which preprocesses job information prior to imaging of individual documents including the preloading of images, reading of variable data, and web synchronization, including by the sub-steps of: (h1) converting data to be supplied to the system into resolution specific bitmaps; (h2) imposing the data from the resolution specific bitmaps onto a specific signature; and (h3) positioning and rotating variable text fields as each signature is built.

19. A system for producing documents at a first site from database information produced at a second site remote from the first site, comprising:

a first computer remote from the second site containing an object association table which associates document production jobs with specific documents and appropriate object descriptions;

a specific print engine at the first site for imaging documents, and electronically controlled by a specific variable print data stream;

a second computer at the second site capable of using the object association table to produce database information containing specific file names;

a third computer remote from the second site for using the database information supplied by said second computer and a job formatting table contained within the third computer for translating the database information containing specific file names from the second computer to produce a print image stream specifically for controlling said specific print engine; and a fourth computer at said first site connected to said specific print engine utilizing the print image stream from said third computer, along with other data, to control said specific print engine to print desired documents containing variable information provided from said second computer database information; and wherein said first and third computers are provided within the same computer housing, and said fourth computer is distinct from said first and third computers.

20. A system for producing documents at a first site from database information produced at a second site remote from the first site, comprising:

a first computer remote from the second site containing an object association table which associates document production jobs with specific documents and appropriate object descriptions;

a specific print engine at the first site for imaging documents, and electronically controlled by a specific variable print data stream;

a second computer at the second site capable of using the object association table to produce database information containing specific file names;

a third computer remote from the second site for using the database information supplied by said second computer and a job formatting table contained within the third computer for translating the database information containing specific file names from the second computer to produce a print image stream specifically for controlling said specific print engine; and a fourth computer at said first site connected to said specific print engine utilizing the print image stream from said third computer, along with other data, to control said specific print engine to print desired documents containing variable information provided from said second computer database information; and wherein said fourth computer pre-rasterizes font data for said print engine, all variable data being provided by the print image stream, so that said print engine can print with substantially no limitations related to the number of different text combinations.

* * * * *